United States Patent [19]

Yamada

[11] Patent Number: 4,619,700

[45] Date of Patent: Oct. 28, 1986

[54] WOOD IMPROVER AND A METHOD OF IMPROVING THE QUALITY OF WOOD

[75] Inventor: Yasutsugu Yamada, Sapporo, Japan

[73] Assignee: Nippon Tensaiseito Kabushiki Kaisha, Tokyo, Japan

[21] Appl. No.: 774,726

[22] Filed: Sep. 11, 1985

Related U.S. Application Data

[63] Continuation of Ser. No. 532,486, Sep. 15, 1983, Pat. No. 4,560,619.

[30] Foreign Application Priority Data

Sep. 18, 1982 [JP] Japan .............................. 57-161592

[51] Int. Cl.$^4$ .......................... C09D 5/14; C09D 5/16; C09D 5/18; C08L 97/02
[52] U.S. Cl. ............................. 106/15.05; 106/18.11; 106/123.1
[58] Field of Search ............... 106/15.05, 18.11, 123.1; 162/159, 160, 161, 163; 427/421, 440; 428/541

[56] References Cited

U.S. PATENT DOCUMENTS

| | | | |
|---|---|---|---|
| 2,319,883 | 5/1943 | Ritchie | 106/123.1 |
| 3,305,435 | 2/1967 | Williston et al. | 162/136 X |
| 3,619,355 | 11/1971 | Silberman | 106/123.1 X |
| 4,191,610 | 3/1980 | Prior | 162/147 |

*Primary Examiner*—Michael R. Lusignan
*Attorney, Agent, or Firm*—Parkhurst & Oliff

[57] ABSTRACT

A wood improver comprising a waste liquor produced by the digestion of pulp, such as kraft, sulfite or semichemical pulp, and optionally further containing a Steffen waste liquor from beet sugar plant and/or polyethylene glycol. Also disclosed is a method of improving the quality of wood by treating it with the improver to prevent its cracking during drying.

8 Claims, No Drawings

WOOD IMPROVER AND A METHOD OF IMPROVING THE QUALITY OF WOOD

This is a continuation of application Ser. No. 532,486 filed Sept. 15, 1983, now U.S. Pat. No. 4,560,619, patented Dec. 24, 1985.

BACKGROUND OF THE INVENTION

1. Field of the Invention:

This invention relates to a wood improver and a method of improving the quality of wood.

2. Description of the Prior Art:

Wood usually has a water content of about 40 to 200% soon after it has been harvested. The water content is expressed in accordance with the following equation:

$$\text{Water content (\%)} = \frac{\text{Water (weight)}}{\text{Dry material (weight)}} \times 100$$

If wooden products are made of wood having such a high wate content (green wood), they are likely to develop problems such as shrinkage, distortion or cracking as they dry by evaporation. These problems are particularly serious with a barked log, a timber product containing the pitch of a tree, or a thick timber product.

In order to prevent the occurrence of such problems, wood has sometimes been treated with polyethylene glycol as a wood improver and thereafter allowed to dry, or it has been dried in a drier having controlled temperature and humidity. The use of polyethylene glycol is, however, limited to special cases since it is too expensive to be commonly used as a wood improver. To the contrary, it is difficult to obtain wood of uniform quality by drying it in a drier, since the quality of wood is easily affected by slight changes of temperature and humidity in the drier. Therefore, there has been a strong need for a wood improver which is inexpensive and can reliably be used to produce wood of uniform quality.

SUMMARY OF THE INVENTION

It is an object of this invention to provide a wood improver which comprises a waste liquor resulting from the digestion of pulp. The wood improver of this invention is useful for treating wood to render it substantially resistant to cracking, resistant to shrinkage upon spontaneous drying or forced drying at an elevated temperature, and resistant to distortion at the time of lumbering, thereby improving its dimensional stability and enabling the manufacture of wooden products having an improved appearance.

It is another object of this invention to provide a method of improving the quality of wood.

DETAILED DESCRIPTION OF THE INVENTION

This invention is based on the discovery that a waste liquor resulting from the digestion of pulp has an excellent wood improving effect. This discovery has been experimentally confirmed to be effective for industrial applications.

The wood improver of this invention may be composed of any waste liquor produced by the digestion of wood pulp in an ordinary pulp plant, without any particular limitation to its composition, viscosity, specific gravity, color or other physical properties. Therefore, it is possible to use, for example, kraft pulp waste liquor or other alkaline waste liquor, sulfite pulp waste liquor or other acidic waste liquor, or semichemical pulp waste liquor or other neutral waste liquor.

The waste liquor is preferably used as a wood improver after being condensed in an evaporator to a solids content of 40-60% (w/w). If a viscous waste liquor is employed, however, it is possible to add an appropriate amount of water thereto. Therefore, in the widest scope of the invention, the wood improver of this invention may comprise a waste liquor having a solids content of about 20 to 60% (w/w).

The wood improver of this invention may further contain polyethylene glycol, which is too expensive to be used alone, or a delimed or non-delimed concentrate of Steffen waste liquor which is an inexpensive waste liquor from beet sugar plant. The ratio of polyethylene glycol and/or Steffen waste liquor is not restricted as long as it does not adversely affect the economy and effectiveness of the improver according to this invention. It is, however, advisable to maintain a total solids content of about 20 to 60% (w/w) in order to obtain an effective improver which is not too viscous. If polyethylene glycol is added, it is preferable to use polyethylene glycol having an average degree of polymerization of 400 to 4000.

If required, the improver of this invention may further contain any other component conventionally used in the wood industry, such as a preservative, an insecticide, a fire retardant or an agent for preventing discoloration. These components produce a still more effective wood improver. For example, the improver of this invention when used with e.g. 0.5 to 5% of a fire retardant available under the tradename of Nonnen® W-2-50 (Marubishi Oil Co., Ltd.) which is composed of phosphate as major component, fire retardancy can be imparted to the wood with simultaneous prevention of cracking. When the improver is used with 0.2–5% of a preservative CCA (Nissan Norin Kogyo Co., Ltd.) which is composed of arsenic, chrome and copper compound as major component, preservability of the wood is enhanced with simultaneous prevention of cracking.

The wood improver of this invention may be applied to wood by any appropriate method, such as coating, impregnation, spraying, hot or cold bath immersion, diffusion or injection, soon after the bark has been removed. Although the ratio of the improver required to achieve a sufficient improving effect depends on the kind and water content of the wood to be treated, the kind and concentration of the pulp waste liquor employed, and the period of immersion, it is usually sufficient to use the improver in a ratio where for each cubic meter of wood 10 to 50 kg of the improver having a solids content of 20 to 60% (w/w), preferably 40 to 55% (w/w), is adsorbed in the wood. If the adsorption of the improver is less than 10 kg, it is difficult sufficiently to achieve the objects of this invention, while the adsorption of over 50 kg does not produce any appreciably increased effect, but is merely a waste of the improver. If the improver of this invention is applied by immersion, it is sufficient to immerse wood in an appropriate ratio of the improver for a period of one to 20 days. Satisfactory results can usually be obtained from three to 10 days of immersion at a temperature of 20°–80° C.

When the improver of this invention is applied to wood by coating, the coating may be effected, for example, by a roller, brush, knife or rod. When the improver is applied by spraying it may be effected by using an ordinary spray machine, or employing butane as a propellant. Any other method can, however, be used without any limitation to apply the improver of this invention to wood.

The improver of this invention is applicable not only to wood in the state of a log, but also to a lumber mill product having a square or other cross section, though the application to a lumber mill product may require a slightly longer time for treatment. The improver is effectively usable for wood or a lumber mill product having a diameter not exceeding 20 cm, and preferably in the range of 10 to 20 cm. A material having a diameter exceeding 20 cm can be treated, but is not preferred, since it requires a prolonged time for treatment and drying.

The method of this invention for improving the quality of wood contributes not only to expanding the use of a waste liquor produced by the digestion of pulp, but also to imparting a high extra value to relatively small wood, such as larch, fir or cedar, having a diameter not exceeding about 20 cm so that they can produce an increased demand. It also enables the effective use of wood of needle-leaved or broad-leaved trees which otherwise is easily damaged. The method is of great use, as it eliminates the necessity for intentional forming of a split in the back of a thick timber such as an alcove pillar, and also as it enables the production of wood of greatly improved quality for use in the construction of houses and furniture.

The invention will now be described with reference to several examples thereof. These examples are, however, not intended to limit the scope of this invention, but various modifications will be possible without departing from the scope of this invention which is defined by the appended claims.

EXAMPLE 1

Red pine chips were digested by the sulfate process, and a kraft pulp waste liquor discharged from the digestor, having a specific gravity of 1.15 and a pH value of 12.7, and containing 5.9 g of $Na_2S$ and 2.5 g of NaOH per liter was concentrated to form a liquor having a solids content of about 55% to prepare a wood improver according to this invention.

Fifty larch trees which had been barked immediately after they had been cut down, and having a diameter of 15 to 20 cm and a length of 3 m, were immersed in the improver of this invention for periods of three and 10 days at ambient temperature. After this immersion, they were stacked outdoors, covered by a roof so that they might not be exposed to direct sunlight, and allowed to dry throughout the summer months. The logs were examined for their water content and occurrence of any cracking at certain intervals of time during their drying. The results are shown in TABLE 1. TABLE 1 also shows the results of the comparative tests conducted on logs which had not been treated with the wood improver.

The untreated wood began to crack after one or two days, and developed many wide and long cracks in an air-dried state. The wood treated with the improver of this invention did not show any cracking or other trouble even after it had been completely dried, excepting that the wood which had been immersed for three days in an improver composed of a semichemical pulp waste liquor showed a few cracks after a week.

Each log in an air-dried state was lumbered to obtain square timbers with pith. Numerous heavy cracks were found in the timbers from the untreated wood, but no cracks or distortions were found in the timbers from the wood which had been treated with the improver of this invention. Further, no cracks or distortions developed in the timbers from the treated wood even when the timbers were left in an air-dried state for a long time. The improver of this example was also effective for preventing cracking of a lumber mill product having a pitch when the improver was applied thereto as described above.

EXAMPLE 2

Pine chips were digested with a calcium-based sulfite. A sulfite pulp waste liquor having a specific gravity of 1.14, a pH value of 4.5, a total $SO_2$ content of 4.5 g/liter, a free $SO_2$ content of 2.0 g/liter, a lignin content of 70.2 g/liter and a total sugar content of 31.8 g/liter was discharged from the digestor, and concentrated to form a liquor having a solids content of about 55%. An improver was prepared by diluting 100 kg of the concentrated liquor with 25 kg of water. The procedures of EXAMPLE 1 were thereafter repeated for immersion and drying. The results are shown in TABLE 1.

EXAMPLE 3

Beech chips were digested by the neutral sulfite process. A semichemical pulp waste liquor having a specific gravity of 1.16, containing 35 g of neutral sodium sulfite and 1.5 g of $Na_2CO_3$ per liter, and also containing sodium ligninsulfonate, sodium salt of organic acid and sodium sulfate was discharged from the digestor, and concentrated to form a liquor having a solids content of about 55%. This liquor was used as an improver, and the procedures of EXAMPLE 1 were repeated for immersion and drying. The results are shown in TABLE 1.

| Example | Improver | Immersion days | Test item | Immediately after treatment | Period of drying (weeks) 1 | 2 | 3 | 4 | 8 |
| --- | --- | --- | --- | --- | --- | --- | --- | --- | --- |
| 1 | KP | 3 | Water content (%) | 84.4 | 65.8 | 45.4 | 34.2 | 26.2 | 18.1 |
|  |  |  | Appearance of cracks | none | none | none | none | none | none |
|  |  | 10 | Water content (%) | 80.1 | 68.4 | 49.3 | 39.6 | 33.3 | 19.6 |
|  |  |  | Appearance of cracks | none | none | none | none | none | none |
| 2 | SP | 3 | Water content (%) | 82.6 | 58.5 | 44.4 | 31.7 | 24.3 | 17.7 |
|  |  |  | Appearance of cracks | none | none | none | none | none | none |
|  |  | 10 | Water content (%) | 85.5 | 62.7 | 45.3 | 33.1 | 28.8 | 18.5 |
|  |  |  | Appearance of cracks | none | none | none | none | none | none |
| 3 | SCP | 3 | Water content (%) | 105.6 | 74.4 | 45.7 | 29.3 | 23.5 | 16.8 |
|  |  |  | Appearance of cracks | none | a few cracks | a few cracks | a few cracks | a few cracks | a few cracks |
|  |  | 10 | Water content (%) | 132.1 | 76.5 | 46.2 | 31.9 | 27.3 | 17.4 |
|  |  |  | Appearance of cracks | none | none | none | none | none | none |
| Control | Untreated |  | Water content (%) | 81.3 | 45.7 | 32.1 | 27.5 | 25.2 | 17.1 |

-continued

| Example | Improver | Immersion days | Test item | Immediately after treatment | Period of drying (weeks) | | | | |
| --- | --- | --- | --- | --- | --- | --- | --- | --- | --- |
| | | | | | 1 | 2 | 3 | 4 | 8 |
| | | | Appearance of cracks | none | a few cracks | many cracks | many cracks | many cracks | many cracks |
| | Average temperature | | Max. (°C.) | | 23.3 | 23.8 | 27.6 | 26.3 | 25.1 |
| | | | Min. (°C.) | | 17.1 | 17.0 | 20.8 | 19.4 | 18.0 |

KP—Kraft pulp waste liquor
SP—Sulfite pulp waste liquor
SCP—Semichemical waste liquor

EXAMPLE 4

The procedure of EXAMPLES 1 and 2 was repeated except that barked linden logs having a diameter of 18 to 20 cm and a length of 3 m were treated by three days of immersion in the improver. The results are shown in TABLE 2.

TABLE 2

| Improver | Test item | Immediately after treatment | Period of drying (weeks) | | | | |
| --- | --- | --- | --- | --- | --- | --- | --- |
| | | | 1 | 2 | 3 | 4 | 8 |
| KP | Water content (%) | 123.2 | 72.5 | 41.4 | 32.3 | 24.9 | 19.5 |
| | Appearance of cracks | none | none | none | none | none | none |
| SP | Water content (%) | 125.7 | 69.2 | 37.8 | 28.9 | 24.1 | 19.1 |
| | Appearance of cracks | none | none | none | none | none | none |
| Untreated | Water content (%) | 121.1 | 55.3 | 30.2 | 25.3 | 20.4 | 17.0 |
| | Appearance of cracks | none | a few cracks | many cracks | many cracks | many cracks | many cracks |

EXAMPLE 5

The following five improvers were prepared by mixing equal weights of the kraft pulp, sulfite pulp or semichemical pulp waste liquor as described in EXAMPLE 1, 2 and 3 and having a solids content of about 55%, and polyethylene glycol or a concentrate of Steffen waste liquor from a beet sugar plant:
(1) Kraft pulp waste liquor + polyethylene glycol;
(2) Sulfite pulp waste liquor + polyethylene glycol;
(3) Semichemical pulp waste liquor + polyethylene glycol;
(4) Kraft pulp waste liquor + concentrated Steffen waste liquor; and
(5) Sulfite pulp waste liquor + concentrated Steffen waste liquor.

The polyethylene glycol had a degree of polymerization of 1,000. The concentrated Steffen waste liquor had a solids content of 55%, a pH value of 9.6, a total sugar content of 8%, a total nitrogen (N) content of 2%, a K₂O content of 6%, an organic content of 18% and an ash content of 6%.

The second and fifth improvers were diluted by adding 25 kg of water per 100 kg. The procedures of EXAMPLE 1 were repeated for immersion and drying, except that wood was immersed for three days in each improver. The results are shown in TABLE 3.

TABLE 3

| Improver | Test item | Immediately after treatment | Period of drying (weeks) | | | | |
| --- | --- | --- | --- | --- | --- | --- | --- |
| | | | 1 | 2 | 3 | 4 | 8 |
| KP + PEG | Water content (%) | 84.2 | 63.7 | 44.3 | 32.8 | 25.9 | 17.9 |
| | Appearance of cracks | none | none | none | none | none | none |
| SP + PEG | Water content (%) | 82.1 | 58.2 | 43.6 | 30.8 | 24.1 | 17.3 |
| | Appearance of cracks | none | none | none | none | none | none |
| SCP + PEG | Water content (%) | 107.7 | 75.3 | 46.3 | 29.4 | 23.2 | 16.5 |
| | Appearance of cracks | none | a few cracks | a few cracks | a few cracks | a few cracks | a few cracks |
| KP + CSF | Water content (%) | 85.4 | 65.2 | 45.8 | 35.1 | 27.4 | 19.0 |
| | Appearance of cracks | none | none | none | none | none | none |
| SP + CSF | Water content (%) | 84.8 | 59.7 | 45.1 | 33.5 | 25.7 | 18.2 |
| | Appearance of cracks | none | none | none | none | none | none |

PEG—Polyethylene glycol
CSF—Condensed Steffen waste liquor

EXAMPLE 6

One hundred and twenty linden logs were treated with the improver by immersion as described in EXAMPLE 4, and dried at a temperature of 70° to 80° C. for 10 days in a box type drier in which no humidity control was effected. The logs were dried successfully without developing cracks.

What is claimed is:
1. A wood improver comprising pulp waste liquor having a solids content adjusted to 20–60% (w/w) and an effective amount of at least one member selected from the group consisting of an insecticide, a fire retardant, an agent for preventing discoloration, Steffen waste liquor from a beet sugar plant and polyethylene glycol, said pulp waste liquor being selected from kraft pulp waste liquor and semichemical pulp waste liquor derived from the digestion of pulp.
2. A wood improver as set forth in claim 1, wherein said waste liquor is kraft pulp waste liquor concentrated from a fresh liquor with a specific gravity 1.15 and pH 12.7 and containing 5.9 g/l of Na₂S.

3. A wood improver as set forth in claim 1, further comprising at least one of, an insecticide, a fire retardant and an agent for preventing discoloration.

4. A wood improver as set forth in claim 1, comprising at least one of Steffen waste liquor from a beet sugar plant and polyethylene glycol.

5. A wood improver as set forth in claim 4, wherein said polyethylene glycol has an average degree of polymerization of 400 to 4000.

6. A wood improver as set forth in claim 1, having a solids content of 40 to 55% (w/w).

7. A wood improver as set forth in claim 1, wherein said waste liquor is semichemical pulp waste liquor concentrated from a fresh liquor with a specific gravity 1.16 and containing 35 g/l of neutral sodium sulfite.

8. A wood improver has set forth in claim 1, wherein said solids content is adjusted to above 25% (w/w).

* * * * *